(12) United States Patent
Kinoshita

(10) Patent No.: US 8,085,444 B2
(45) Date of Patent: Dec. 27, 2011

(54) IMAGE GENERATING APPARATUS, IMAGE GENERATING METHOD, IMAGE DISPLAY MEDIUM, AND COMPUTER READABLE RECORDING MEDIUM

(75) Inventor: Koji Kinoshita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1121 days.

(21) Appl. No.: 11/859,896

(22) Filed: Sep. 24, 2007

(65) Prior Publication Data

US 2009/0110230 A1    Apr. 30, 2009

(30) Foreign Application Priority Data

Sep. 25, 2006    (JP) ................... 2006-259634

(51) Int. Cl.
*H04N 1/40*    (2006.01)
(52) U.S. Cl. .................... 358/3.28; 358/3.13
(58) Field of Classification Search .............. 358/3.28
See application file for complete search history.

(56) References Cited

U.S. PATENT DOCUMENTS

| | | | | |
|---|---|---|---|---|
| 5,149,140 | A * | 9/1992 | Mowry, Jr. et al. | 283/93 |
| 5,919,730 | A * | 7/1999 | Gasper et al. | 503/201 |
| 6,731,407 | B1 * | 5/2004 | Hayama | 358/3.2 |
| 7,139,101 | B2 * | 11/2006 | Loce et al. | 358/3.06 |
| 7,532,739 | B2 * | 5/2009 | Fujiwara | 382/100 |
| 7,609,396 | B2 * | 10/2009 | Harada | 358/1.1 |
| 7,697,170 | B2 * | 4/2010 | Otake et al. | 358/3.28 |
| 7,889,382 | B2 * | 2/2011 | Wakana | 358/1.18 |
| 7,903,288 | B2 * | 3/2011 | Takeishi | 358/2.1 |
| 7,920,817 | B2 * | 4/2011 | Oomura et al. | 399/366 |
| 2003/0076540 | A1 * | 4/2003 | Hamashima et al. | 358/3.28 |
| 2003/0179399 | A1 * | 9/2003 | Matsunoshita | 358/1.13 |
| 2004/0150859 | A1 * | 8/2004 | Hayashi | 358/3.28 |
| 2005/0052705 | A1 * | 3/2005 | Hersch et al. | 358/3.28 |
| 2005/0078974 | A1 * | 4/2005 | Uchida et al. | 399/81 |
| 2005/0078993 | A1 * | 4/2005 | Oomura et al. | 399/366 |
| 2005/0135856 | A1 * | 6/2005 | Uchida et al. | 399/411 |
| 2005/0162682 | A1 * | 7/2005 | Aritomi et al. | 358/1.14 |
| 2005/0190411 | A1 * | 9/2005 | Ohno | 358/3.28 |
| 2005/0219634 | A1 * | 10/2005 | Murakami | 358/3.28 |

FOREIGN PATENT DOCUMENTS

| | | |
|---|---|---|
| JP | 2001-324898 | 11/2001 |
| JP | 2003-224717 | 8/2003 |
| JP | 2005-295519 | 10/2005 |

OTHER PUBLICATIONS

Japanese Office Action mailed on Aug. 24, 2011, issued for JP Application No. 2006-259634, filed Sep. 25, 2006.

* cited by examiner

*Primary Examiner* — Sath V Perungavoor
(74) *Attorney, Agent, or Firm* — Oblon, Spivak, McClelland, Maier & Neustadt, L.L.P.

(57) ABSTRACT

A leak-prohibited image to be subjected to leak prohibition is comprised of dots DT so that two dots are included in an 8×8 matrix at a resolution of 600 dpi. The leak-prohibited image is formed as a computer terminal acquires image data, converts the image data to an image comprised of discrete microdots DT which cannot be resolved by copying, and outputs the converted image. Because the leak-prohibited image cannot be copied even if an image including the leak-prohibited image is copied, copy-originated information leak can be prohibited. Synthesizing a concealment image having a regularly discrete pattern with such a leak-prohibited image makes it difficult to view the leak-prohibited image from other directions than a front, thus prohibiting information leak by peeping.

4 Claims, 2 Drawing Sheets

IMAGE GENERATING APPARATUS, IMAGE GENERATING METHOD, IMAGE DISPLAY MEDIUM, AND COMPUTER READABLE RECORDING MEDIUM

BACKGROUND OF THE INVENTION

1. Field of the Invention

The present invention relates to an image generating apparatus, an image generating method, an image display medium, and a computer readable recording medium, and, more particularly, to an image generating apparatus, an image generating method, an image display medium, and a computer readable recording medium which are fit for prohibition of information leak.

2. Description of the Related Art

The advanced copying technology can create copies which are difficult to be distinguished from their originals. Unexamined Japanese Patent Application KOKAI Publication No. 2005-295519 and Unexamined Japanese Patent Application KOKAI Publication No. 2001-324898, for example, disclose techniques of discriminating a copy from an original using a background tint pattern to determine whether a subject is a copy.

In the invention described in Unexamined Japanese Patent Application KOKAI Publication No. 2005-295519, as shown in FIG. 1 thereof, a background tint for alteration or manipulation verification and a background tint for detecting illegal duplication are comprised of plural kinds of dots, and a dot image for detection is generated according to an image to be protected by the background tints. Then, the dot image for detection is superimposed on the image to be protected, thereby yielding a superimposed image. This can ensure alteration verification and can permit a copy, if duplicated from an original, to be visually discriminated.

The invention described in Unexamined Japanese Patent Application KOKAI Publication No. 2001-324898, as illustrated in FIG. 13 thereof, generates a security background tint comprising a basic security background tint which disappears at the time of duplication by a copying machine and a concealed security background tint which is clearly duplicated at the time of duplication by the copying machine. The security background tint is printed together with a print image. As a result, when the printout is copied, the background tint disappears or stands out, thus making it possible to discriminate the original from a copy.

From the viewpoint of privacy protection, it is emphasized to protect personal information. Particularly, the advancement of copying technology makes printing and duplication easier, making it necessary to be cautious about information security. Although the techniques described in the aforementioned publications can discriminate a copy from an original and alteration of the contents thereof, the techniques are not effective in suppressing information leak for an image and/or characters on a copy can be viewed.

Accordingly, it is an object of the present invention to provide an image generating apparatus, an image generating method, an image display medium, and a computer readable recording medium which suppress image-based leakage of information.

SUMMARY OF THE INVENTION

To achieve the object, an image generating apparatus according to a first aspect of the present invention comprises:
an image acquisition unit that acquires an image to be subjected to leak prohibition;
an image conversion unit that converts the image acquired by the image acquisition unit to a leak-prohibited image which cannot be resolved by copying; and
an output unit that outputs an image including the leak-prohibited image converted by the image conversion unit,
whereby the image conversion unit converts the acquired image to an image comprised of discrete microdots which cannot be resolved by copying.

To achieve the object, an image generating apparatus according to a second aspect of the present invention comprises:
an image acquisition unit that acquires an image to be subjected to leak prohibition;
an image conversion unit that converts the image acquired by the image acquisition unit to a leak-prohibited image comprised of discrete microdots;
an image synthesizing unit that synthesizes the leak-prohibited image converted by the image conversion unit with a concealment image for concealing the leak-prohibited image; and
an output unit that outputs an image including the image synthesized by the image synthesizing unit.

To achieve the object, an image generating method for generating an image using a computer according to a third aspect of the present invention executes:
an image acquisition step of acquiring an image to be subjected to leak prohibition;
an image conversion step of converting the image acquired at the image acquisition step to a leak-prohibited image which cannot be resolved by copying; and
an output step of outputting an image including the leak-prohibited image converted at the image conversion step.

To achieve the object, according to a fourth aspect of the present invention, there is provided an image display medium for displaying an image including a leak-prohibited image to be subjected to leak prohibition, the leak-prohibited image being comprised of discrete microdots which cannot be resolved by copying.

To achieve the object, according to a fifth aspect of the present invention, there is provided a computer readable recording medium storing a program which allows a computer to achieve:
a function of acquiring an image to be subjected to leak prohibition;
a function of converting the acquired image to a leak-prohibited image which cannot be resolved by copying;
a function of synthesizing a concealment image comprised of a regularly discrete pattern with the leak-prohibited image; and
a function of outputting an image including the leak-prohibited image.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A preferred embodiment of the present invention will be described below with reference to the accompanying drawings.

Figure 1:
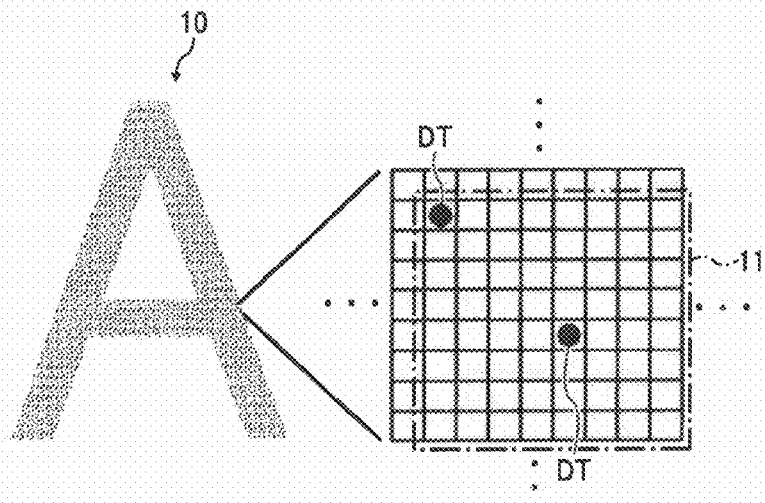
FIG. 1 is a diagram for explaining an image shown on an image recording medium according to an embodiment of the present invention.

The embodiment will be described by way of example where a paper printout is used as an image display medium. FIG. 1 shows a character image "A" as a leak-prohibited image 10 which is a leak prohibition target. The leak-prohibited image 10 is a monochromatic image to be displayed on a printout, and is comprised of black dots DT with a resolution of 600 dpi (Dot Per Inch), for example.

FIG. 1 also shows an enlarged view of dots DT constituting the leak-prohibited image 10. The dots DT constituting the leak-prohibited image 10 are microdots arranged discretely so that only two dots are displayed in, for example, an 8×8 matrix at a resolution of 600 dpi. The dots DT arranged in such a way that only two dots are displayed in an 8×8 matrix at a resolution of 600 dpi cannot be resolved by an ordinary copying machine as dots constituting an image. If the leak-prohibited image 10 comprised of dots DT is copied on a printout, therefore, the leak-prohibited image 10 is not transferred.

Figure 2:
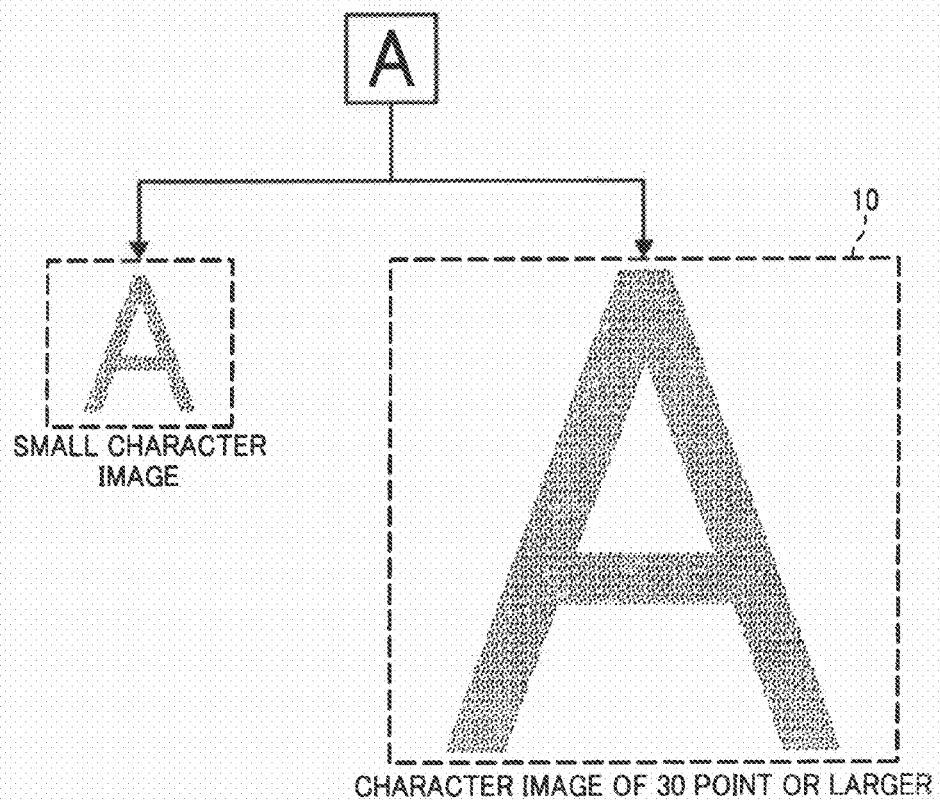
FIG. 2 is a diagram for explaining a visual integral effect of a character image shown in FIG. 1.

In the embodiment, a character image with a size of, for example, 30 point is used as leak-prohibited image 10 for the following reason. Because the leak-prohibited image 10 is comprised of the aforementioned discrete microdots DT, it is difficult to discriminate a character in a small character image, but a character with a relatively large size, such as 30 point or larger, is visible by a visual integral effect, as shown in FIG. 2.

Figure 3:
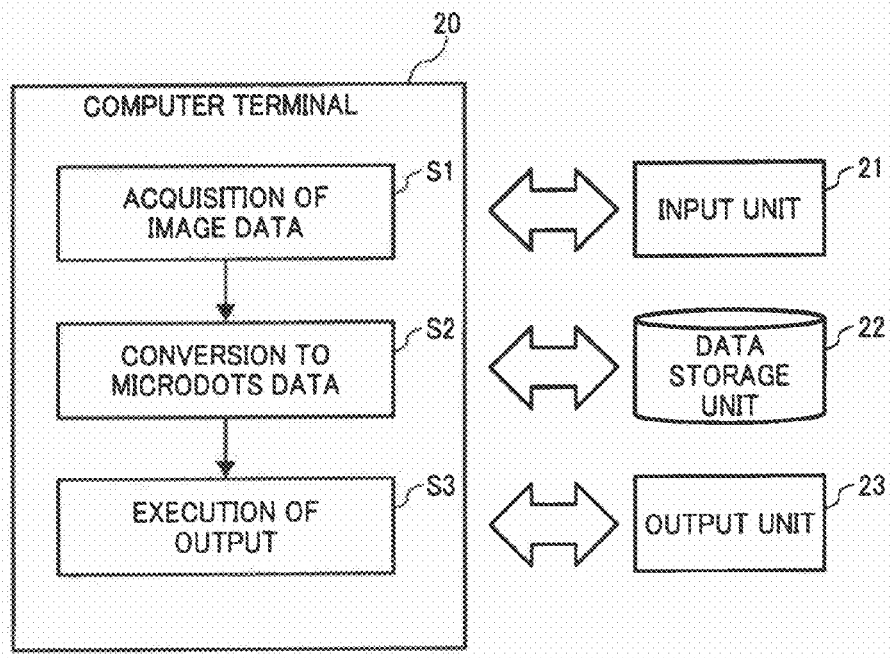
FIG. 3 is a block diagram showing the configuration of a computer which generates image data according to the embodiment of the invention, and processes to be achieved by the functions of the computer.

Referring to FIG. 3, a description will now be given of a computer terminal 20 as an image generating apparatus according to the embodiment which generates data used in displaying an image on a printout.

The computer terminal 20 has a control unit. The control unit may comprise an arithmetic operation unit, such as a CPU (Central Processing Unit), and memory units, such as a RAM (Random Access Memory) and ROM (Read Only Memory). The control unit executes processes to be discussed later (processes including an acquisition stage, data conversion stage and output execution stage). Accordingly, the control unit functions as an acquisition unit, a data conversion unit, an output execution unit, etc.

The acquisition unit acquires image data to be subjected to information leak prohibition. The data conversion unit converts the acquired image data to a leak-prohibited image 10, comprised of discrete microdots DT which cannot be resolved by copying, by thinning the acquired image data using dot-remover mask data stored in a mask data storage unit. The output execution unit outputs an image including the leak-prohibited image 10 converted by the data conversion unit.

The computer terminal 20 includes an input unit 21, a data storage unit 22 as the mask data storage unit, and an output unit 23, and data signals are transferred among those units (21, 22, 23). The input unit 21 receives a user instruction and data or the like to be displayed on a printout. Specifically, the input unit 21 may be a keyboard, a mouse or the like.

Data such as dot-remover mask data for thinning dots is stored in the data storage unit 22. The dot-remover mask data has a value of "1" allocated to two discrete squares in an 8×8 matrix 11 as shown in FIG. 1, and a value of "0" allocated to the other squares. The dot-remover mask data is sequentially laid over image data to provide conversion data having values of logical products of the image data and the dot-remover mask data. The use of the dot-remover mask data permits an image acquired as an information leak prohibition target to be converted to the leak-prohibited image 10 comprised of microdots DT arranged discretely in such a way that two dots are included in the 8×8 matrix 11 at a resolution of 600 dpi.

The output unit 23 may be a printing apparatus, such as a printer. The output unit 23 prints an image including the leak-prohibited image 10 comprised of the dots DT on a image display medium, such as paper.

Next, a process of generating the leak-prohibited image 10 and displaying the leak-prohibited image 10 on the image display medium will be described referring to FIG. 3.

First, the computer terminal 20 acquires image data to be printed (step S1). In the embodiment, using the input unit 21, the user gives a print instruction designating, for example, text data or the like containing character information. Based on the print instruction, the control unit of the computer terminal 20 acquires character data of the designated text as image data from, for example, the storage unit where the image data is stored. At this time, if the size of characters contained in the designated text data is not equal to or larger than 30 point, the computer terminal 20 may prompt the user to change the size to 30 point or larger, or may forcibly change the character size, to acquire character data of 30 point or larger.

Next, the computer terminal 20 converts the acquired image data to the leak-prohibited image 10 comprised of discrete microdots which cannot be resolved by copying (step S2). Specifically, the control unit overlays data with an array of dot-remover mask data on the acquired image data. Data which displays a dot DT is placed at a data position where the logical product of the overlaid portion is "1", while data which does not display a dot DT is placed at a data position where the logical product of the overlaid portion is "0". As a result, the acquired image data is converted to image display data having the dots thinned out in such a way that the image data has two dots in the 8×8 matrix 11.

Next, the computer terminal 20 executes an output process to the output unit 23 (step S3). Specifically, the control unit converts the image data converted and generated at step S2 to print data, and sends the print data to the output unit 23. Then, the output unit 23 executes a print process to produce a printout.

The embodiment can have the following advantages.

In the embodiment, the leak-prohibited image 10 to be displayed on a printout is comprised of discrete dots DT of 600 dpi. Further, the dots DT are microdots arranged discretely in such a way that only two dots are displayed in each 8×8 matrix 11. Such dots DT are not identified as dots by an ordinary copying machine, so that the leak-prohibited image 10 does not appear on a printout on which the leak-prohibited image 10 is copied. The leak-prohibited image 10 comprised of dots DT arranged discretely in such a way that only two dots are displayed in every 8×8 matrix 11 at a resolution of 600 dpi becomes a thin image. When someone views the image from other directions than the front, it is difficult to clearly identify the image. It is therefore possible to effectively suppress peek-based information leak.

In the embodiment, a character image with a size of 30 point or larger is used as a leak-prohibited image 10. In this case, if the leak-prohibited image 10 is comprised of discrete microdots, a character is visible by the visual integral effect. Even if a character image is printed in such a way as to prevent duplication or peeking, therefore, the character can be read.

According to the embodiment, the computer terminal 20 acquires image data to be printed (step S1), and converts the image data to data which is expressed by discrete microdots (step S2). In step S2, the control unit of the computer terminal 20 converts the image data to dot-removed image display data using dot-remover mask data.

Further, the computer terminal 20 sends print data converted from the image display data to the output unit 23, and allows the output unit 23 to execute a print process. This makes it possible to display on a printout an image including the leak-prohibited image 10 comprised of dots DT arranged in such a way that only two dots are displayed in an 8×8 matrix 11 at a resolution of 600 dpi. Therefore, a printout which can prevent duplication or peeking can be generated efficiently.

The embodiment may be modified as follows.

Figure 4:
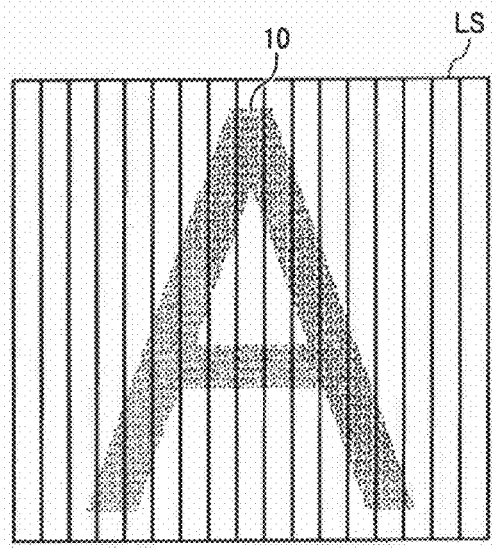
FIG. 4 is a diagram showing a displayed character image concealed by a concealment image.

In the embodiment, a leak-prohibited image 10 comprised of dots DT is displayed on a printout. Alternatively, a leak-prohibited image 10 synthesized with a line screen LS comprised of a plurality of parallel vertical lines as shown in FIG. 4 may be displayed.

The line screen LS serves as a regularly discrete concealment image. Specifically, as in the embodiment, the leak-prohibited image 10 in FIG. 4 is comprised of dots DT arranged discretely in such a way that only two dots are displayed in an 8×8 matrix 11 at a resolution of 600 dpi. As the line screen LS is placed over the leak-prohibited image 10, therefore, when a person sees the display, the regularly patterned line screen LS is conspicuous if seeing it from other directions than the front. This makes it difficult to identify the leak-prohibited image 10 underlying the line screen LS.

Dots DT lying near the line screen LS are dense and may be copied. Even in this case, however, whether dots DT are copied or not relates to the contents the positions of dots (dot density) corresponding to the line screen LS, not the contents of the leak-prohibited image 10. This makes it difficult to identify the leak-prohibited image 10 from the image-copied printout.

In case of printing the leak-prohibited image 10 with the line screen LS added thereto using the computer terminal 20, the computer terminal 20 also serves as a synthesized image generating unit. This synthesized image generating unit synthesizes the image display data with data acquired from an additional image data storage unit to generate synthesized image data. Further, additional image data about the line screen LS may be stored in the data storage unit 22.

In this case, the computer terminal 20 generates the synthesized image data after converting a target image to data expressed by discrete microdots (step S2). Specifically, the control unit of the computer terminal 20 acquires additional image data indicating the line screen LS from the data storage unit 22. Then, the control unit generates synthesized image data having the acquired additional image data synthesized with the image display data converted at step S2. Then, the control unit executes an output process to the output unit 23 (step S3).

At this time, the control unit uses the generated synthesized image data instead of the image display data converted at step S2. To be specific, the control unit converts synthesized image data to print data, sends the print data to the output unit 23, and allows the output unit 23 to execute a print process.

Although the line screen LS comprised of regularly discrete parallel lines is used as a concealment image, an image to be used as a concealment image has only to be a regularly discrete image, and may be images with other regularly discrete patterns, such as circles, oblique lines, wavy lines, triangles, rectangles, polygons and combination of some or all of them.

Although a leak-prohibited image 10 comprised of dots DT arranged in such a way that only two dots are displayed in an 8×8 matrix 11 at a resolution of 600 dpi is displayed on an image display medium in the embodiment, the resolution and the number of dots are optional as long as the leak-prohibited image 10 is comprised of discrete microdots which cannot be resolved by copying. Even in a case where the leak-prohibited image 10 is comprised of dots DT at a mesh of 4% or so at a resolution of 600 dpi or higher, for example, similar effects can be obtained.

Although a character image with a size of 30 point or larger is used as a leak-prohibited image 10 in the embodiment, the character size is not limited to such a size as long as a character is visible by the visual integral effect; for example, the character size may be less than 30 point.

In the embodiment, an image is comprised of dots DT arranged in such a way that only two dots are displayed in every 8×8 matrix 11 at a resolution of 600 dpi. Alternatively, a portion other than an image may be comprised of discrete microdots DT which cannot be resolved by copying at a resolution of 600 dpi or higher. In this case, because a character on a printout is displayed like a negative photo, effects similar to the aforementioned effects of the embodiment can be acquired.

Although character image is displayed as a leak-prohibited image 10 in the embodiment, which is not restrictive, any other image to be subjected to suppression of information leak than a character image may be used. For example, an image showing a symbol and a numeral, or a mark, such as a symbol mark or logo mark, may be used as well.

In the embodiment, a leak-prohibited image 10 to be displayed on a printout is a monochromatic image comprised of black dots. Instead, the leak-prohibited image 10 may be a color image comprised of dots DT of, for example, CMYK (Cyan, Magenta, Yellow, Black) type color elements or RGB (Red, Green, Blue) type color elements. In this case, a character is identified while concealing an image by arranging dots DT on a background image drawn in another color.

In the embodiment, the computer terminal 20 separate from the output unit 23 as a printing apparatus converts image data to image display data which is expressed by microdots DT (step S2). Alternatively, the processes the computer terminal 20 execute may be carried out by the printing apparatus. For example, a program which allows the computer terminal 20 to execute the processes may be installed in the control unit of the printing apparatus, so that the printing apparatus executes the processes based on the program.

Such a program may be stored in a recording medium, such as a CD-ROM (Compact Disk Read-Only Memory), for distribution, and the program stored in such a recording medium may be installed in any of various apparatus, and be executed by a computer which controls the apparatus to generate and output the aforementioned leak-prohibited image 10. Or, the program may be distributed through telecommunications networks such as the Internet.

A printing apparatus is used as the output unit 23 in the embodiment. Instead, the output unit 23 may be a display apparatus, such as a display, a liquid crystal display panel or an electronic paper. Specifically, the computer terminal 20 converts image data to image display data using dot-remover mask data, generates display data from the image display data, and displays an image based on the display data. This can allow the display apparatus to be used as an image display medium.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based upon Japanese Patent Application No. 2006-259634, filed on Sep. 25, 2006, the entire contents of which are incorporated herein by reference.

What is claimed is:

1. A printing system for use with a copier which cannot resolve an image including dots occupying a predetermined percentage of a predetermined portion of an image, the printing system comprising:
   a processor to generate image data including a main image including character data represented by a group of dots which corresponds to an acquired image, the group of dots being equal to the predetermined percentage of the predetermined portion; and
   a printer to print the main image including the character data represented by the group of dots which are equal to the predetermined percentage of the predetermined portion, the printed group of dots being visible to a human through a visual integration effect,
   wherein the processor to generate image data converts the acquired image to the group of dots comprised of dots arranged such that only two dots are included in an 8×8 matrix at a resolution of 600 dpi.

2. The printing system according to claim 1, further comprising a mask data storage unit that stores mask data,
   wherein the processor to generate image data converts the acquired image to the group of dots by thinning the acquired image using the mask data stored in the mask data storage unit.

3. An image generating method for generating an image using a computer, comprising:
   acquiring an image to be converted;
   converting the image acquired by the acquiring step to a converted image which cannot be resolved by copying, the converted image including a main image which includes character data represented by dots occupying equal to a predetermined percentage of a predetermined portion of the converted image; and
   printing the converted image including the main image including the character data represented by the dots occupying equal to the predetermined percentage of the predetermined portion of the converted image such that the converted image is visible to a human through a visual integration effect,
   wherein the converting converts the acquired image to the converted image including dots arranged such that only two dots are included in an 8×8 matrix at a resolution of 600 dpi.

4. A non-transitory computer readable recording medium storing a program which causes a computer to perform the steps of:
   acquiring an image to be converted;
   converting the image acquired by the acquiring step to a converted image which cannot be resolved by copying, the converted image including a main image which includes character data represented by dots occupying equal to a predetermined percentage of a predetermined portion of the converted image; and
   printing the converted image including the main image including the character data represented by the dots occupying equal to the predetermined percentage of the predetermined portion of the converted image such that the converted image is visible to a human through a visual integration effect,
   wherein the converting converts the acquired image to the converted image including dots arranged such that only two dots are included in an 8×8 matrix at a resolution of 600 dpi.

* * * * *